United States Patent [19]

Vergato, Sr.

[11] Patent Number: 5,431,380
[45] Date of Patent: Jul. 11, 1995

[54] ELECTRICIAN'S HELPER

[76] Inventor: Richard F. Vergato, Sr., 41 Woods Rd., Medford, Mass. 02156

[21] Appl. No.: 164,924

[22] Filed: Dec. 10, 1993

[51] Int. Cl.6 .............................................. B25B 1/20
[52] U.S. Cl. .................................... 269/37; 269/904; 269/246
[58] Field of Search ...................... 269/904, 6, 37, 41, 269/43, 246; 33/DIG. 10

[56] References Cited
U.S. PATENT DOCUMENTS 3,751,026  8/1973  Stickney ............................. 269/904
4,479,639 10/1984  Kane .................................. 269/904

Primary Examiner—Robert C. Watson

[57] ABSTRACT

An apparatus for accurately setting the height and depth placement of electrical boxes on wall studs or the like. The apparatus telescopically extends to the required height and a plurality of steps are disposed upon both a top plate and base plate. The steps correspond to various wall covering thicknesses. Proper operation ensures accurate positioning and maintenance of the height and depth settings.

3 Claims, 4 Drawing Sheets

/ 1

ELECTRICIAN'S HELPER

BACKGROUND OF THE INVENTION

Whether or not a building is newly constructed or renovated there is a substantial likelihood that a large number of electrical boxes will exist. Each electrical box is typically mounted at a standard height from the floor. It also must protrude outward some distance from its mount to enable it to seat flush with the finished wall covering. A great deal of time could be saved if an electrician were not forced to individually measure and locate each electrical box. Furthermore the risk of human error could be minimized by the use of a tool that allowed the electrician to mount electrical boxes at a consistent height and depth capable of being selected in the field.

Therefore a tool is needed that would provide an electrician with the capability to preset dimensions for the exact height off the floor as well as depth into the wall for each electrical box. This tool should be inexpensive and simple to use yet would be capable of allowing rapid as well as reliable placement of each electrical box. The prior art discloses a number of methods previously designed to solve this problem, however each have drawbacks and none provide as simple a solution to the problem as does the present invention.

Accordingly, it is an object of this invention to provide an electrical box locator tool that enables the user to quickly and accurately maintain consistent placement of a quantity of electrical boxes at some predetermined height and depth.

It is another object of this invention to provide an electrical box locator tool that is both inexpensive to manufacture and simple to use.

A still further object of this invention is to provide an electrical box locator tool that is capable of complete disassembly thus taking up minimal space in an electrician's tool kit while allowing easy replacement of specific parts.

SUMMARY

The present invention is directed to a tool that accomplishes the above needs. This invention will enable all electricians to easily install electrical boxes of most all types, at the proper height and depth, quickly, accurately, and efficiently, saving many hours of tedious labor which helps keep costs down.

An electrical box located tool having features of he present invention comprises a base plate and a top plate, each having a plurality of steps conforming to the thickness of various wall coverings. Each step in the base plate is dimensionally duplicated to a corresponding step in the top plate. Connected to each, the top plate and the base plate is a perpendicularly disposed rod or tube. One such rod or tube, the stem, internally engages the other, the sheath, thereby creating a sliding subassembly. Units of measure are marked on the stem which correspond to the overall length of the tool from the bottom of the base plate to the top of the top plate.

Operation of the device is simple. Turn the adjustment bolt clockwise or counterclockwise to reach the required height adjustment prior to installing the electrical boxes. Once the height off the floor has been determined, place the tool up against a wall stud with the base plate on top of the bottom wall plate. This will provide an exact height every time. To set the depth, simply select one of the plurality of the steps on the top plate and the base plate, depending on the wall's finished surface. This depth dimension can vary anywhere from ⅜" to ¾". Proper placement of the electrical box on the top surface of the top place will give you the exact finish depth for the installation of every electrical box.

BRIEF DESCRIPTION OF DRAWINGS

A further understanding of the present invention will be accomplished upon consideration of the following drawings and detailed description that follow wherein.

DETAILED DESCRIPTION

Figure 2:
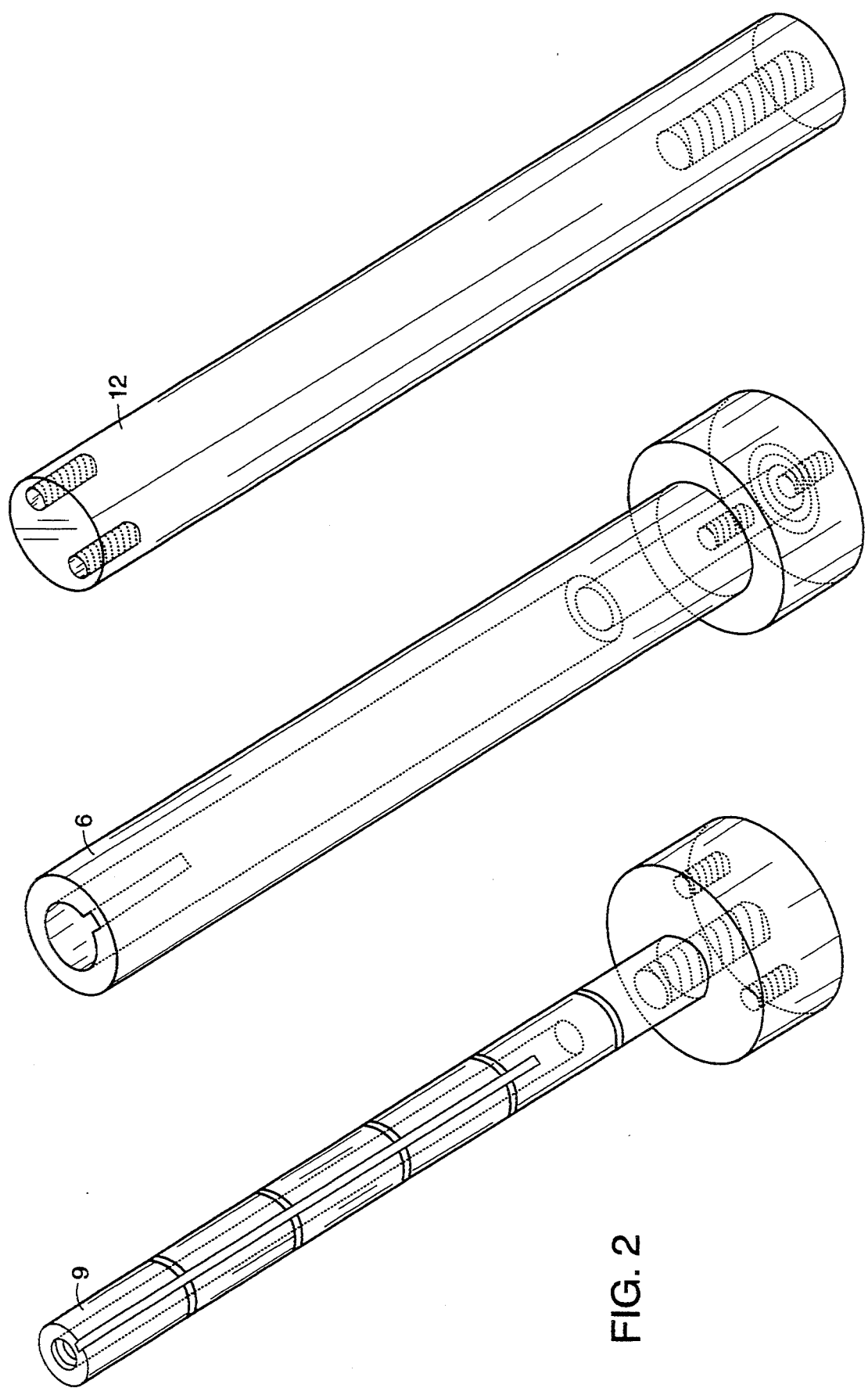
FIG. 2 is a detailed view illustrating the height adjustment stem, the height adjustment sheath, and an optional 30" extension rod which can be used to properly locate electrical boxes at switch height when needed.
Figure 3:
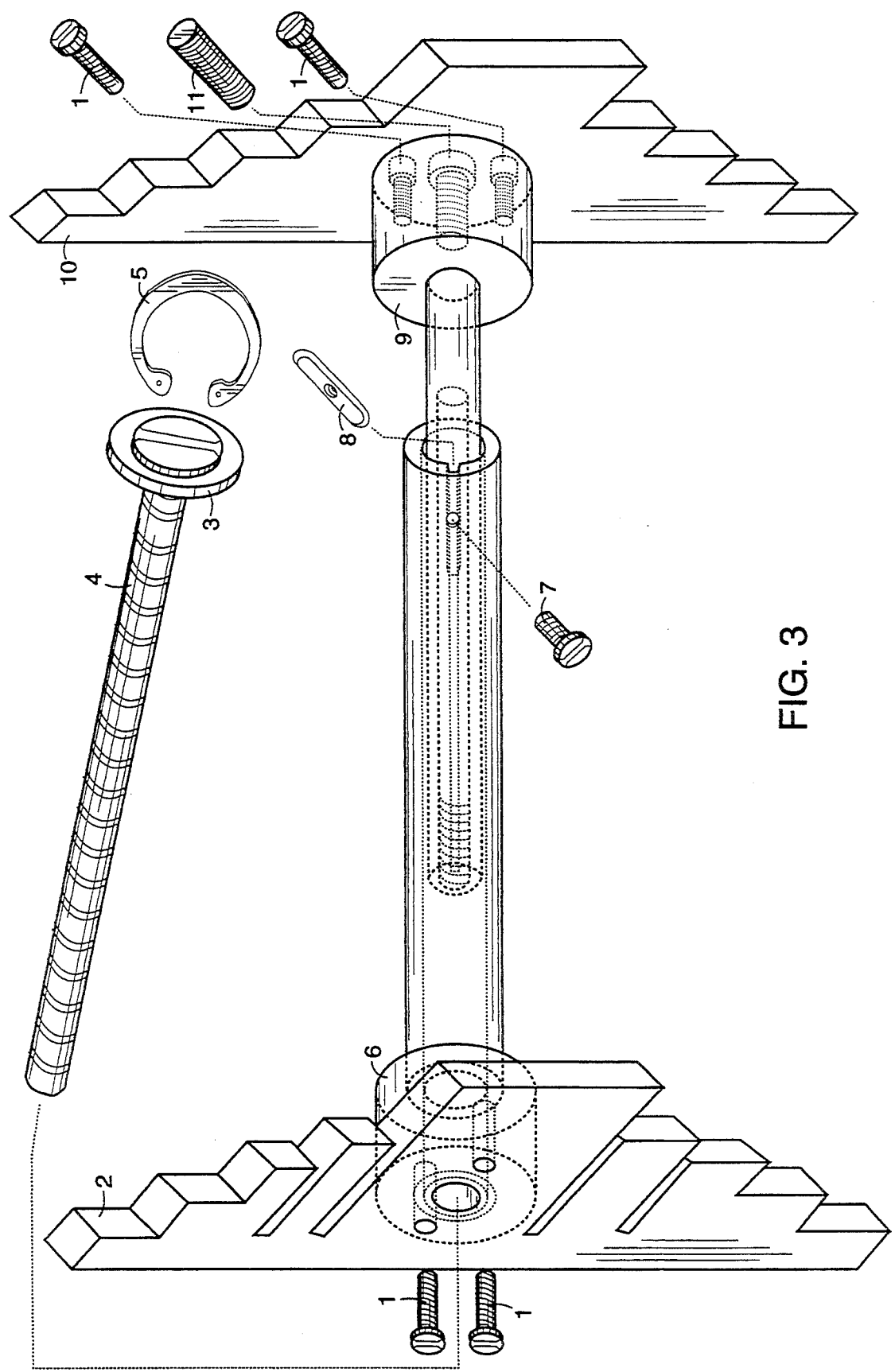
FIG. 3 is an elevation view with the FIG. 1 parts exploded showing the relationship of each part and how the entire unit assembles together.
Figure 4:
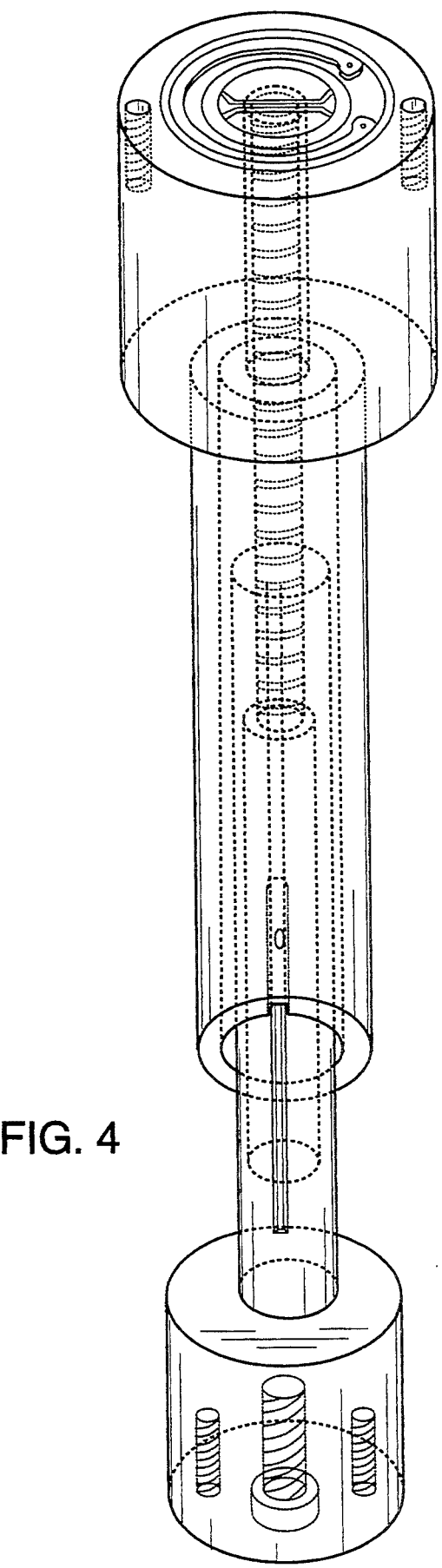
FIG. 4 is a detailed view showing the relationship of snap ring 5 to washer 3 and member 9.

FIGS. 2 through 3 portray a tool 13 which includes a top plate 2, a base plate 10, a height adjustment stem 9, a height adjustment sheath 6, and an adjustment bolt 4. In the FIG. 3 illustrated embodiment the top plate 2 is demountably attached in perpendicular relation to the height adjustment sheath 6 by bolts 1, whereas the base plate 10 is demountably attached in perpendicular relation to the height adjustment stem 9. It is immaterial to the operation of the tool whether this particular configuration is used or whether the mounting arrangement is reversed.

FIG. 2 portrays the height adjustment stem 9, containing a machined channel 14 extending longitudinally along the exterior of the height adjustment stem 9. This channel slidably engages key 8 which is mounted to the inside of the height adjustment sheath 6 by screw 7. Height adjustment stem 9 is internally threaded for a short distance 15 in order to receive adjustment bolt 4.

Figure 1:
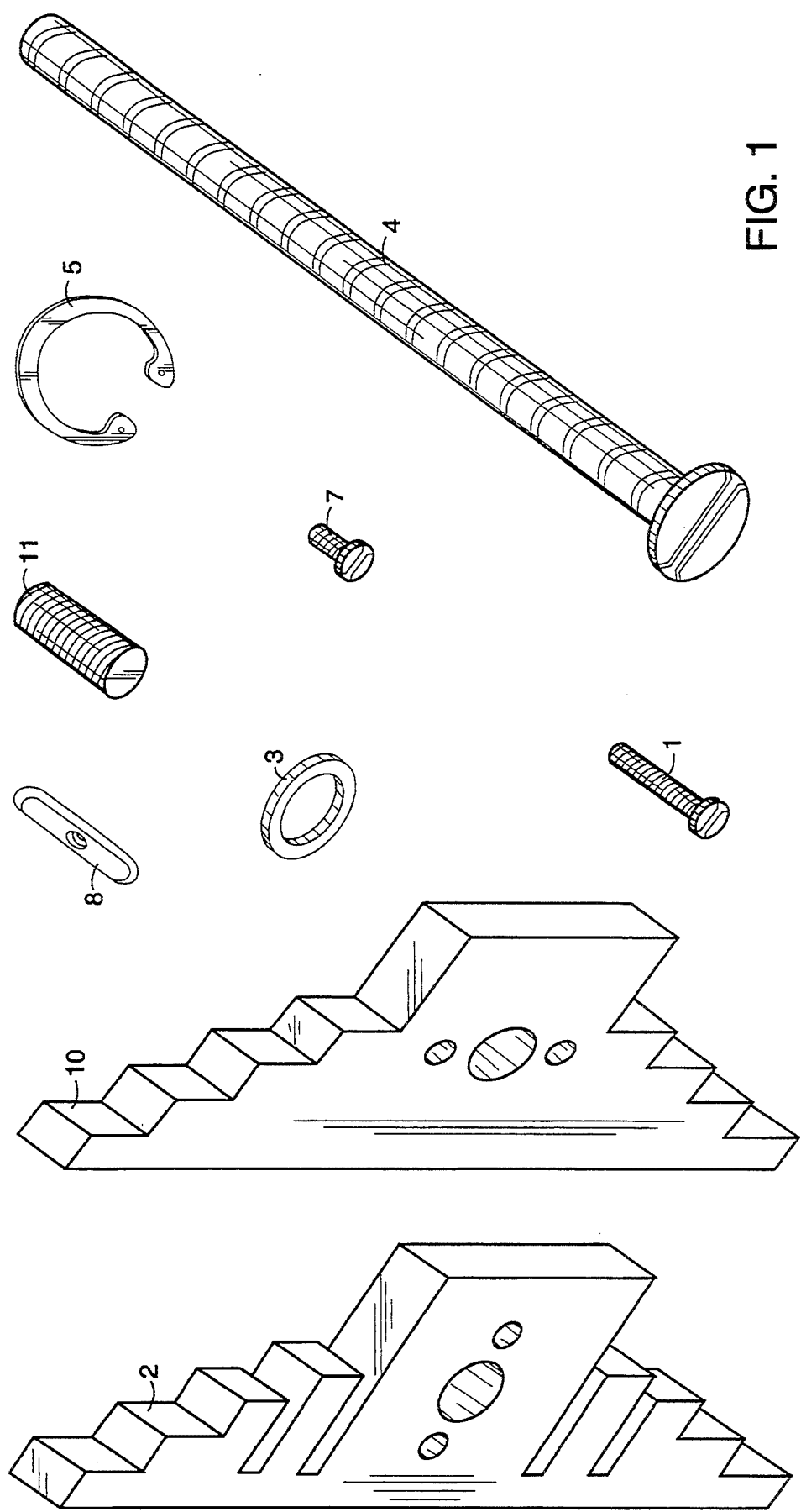
FIG. 1 is a detailed view illustrating the slotted top plate which must be slotted to accept the mounting strap on new work electrical boxes when installing beyond a ½" finished surface, the unslotted base plate key used to keep the top plate and base plate in parallel alignment with each other, and the adjustment bolt used to adjust the assembled tool to the exact height needed.

FIGS. 1 through 3 demonstrate that the tool is assembled by sliding key 8 into height adjustment sheath 6 and securing with screw 7. The base plate 10 is attached to the height adjustment stem using bolts 1, then the resulting subassembly is slid into height adjustment sheath 6 so that channel 14 slidably engages key 8. Washer 3 is permanently welded to the underside of the head of adjustment bolt 4. Adjustment bolt 4 is then slid into height adjustment sheath 6 until washer 3 bottoms out against height adjustment sheath 6. Snap ring 5 is next placed over the head of the subassembly comprising adjustment bolt 4 and washer 3. The outside circumference of snap ring 5 is tightly seated in a relief machined into height adjustment sheath 6. The bottom surface of snap ring 5 is seated against the top surface of washer 3. This arrangement secures adjustment bolt 4 within height adjustment sheath 6 thereby preventing any longitudinal movement that adjustment bolt 4 could otherwise undergo. Adjustment bolt 4 can now be turned in the appropriate direction resulting in height adjustment stem 9 being drawn into height adjustment sheath 6. Finally, top plate 2 is attached to height adjustment sheath 6 using bolts 1.

Operation of the device is simple, by assembling these parts, the necessary height measurement can be accurately determined by noting the dimension marking on height adjustment stem 9 at the location where the edge of height adjustment sheath 6 overlaps said stem. Adjustment bolt 4 is disposed within height adjustment stem 9 and height adjustment sheath 6 to enable the operator to accurately set this height dimension. Turning adjustment bolt 4 in one direction causes height adjustment stem 9 to slidably move into height adjustment sheath 6 resulting in a reduction in the overall length of tool 13. Turning adjustment bolt 4 in the opposite direction results in an increase in tool length. To set the proper height, an operator must turn adjustment bolt 4 in the appropriate direction until the desired measurement is indicated at the interface of height adjustment stem 9 and height adjustment sheath 6. Once the height dimension off the floor has been determined, the dimension will remain consistent until the operator turns adjustment bolt 4.

To set the depth of placement, the proper step on both top plate 2 and base plate 10 must be selected from the plurality of steps. The correct step will dimensionally correspond to the thickness of the finished wall covering. Measurement can be made from the straight edge of either top plate 2 or base plate 10 to the parallel surface of one of the plurality of steps. Once the correct step is selected, tool 13 is then placed against the wall stud to which the finished electrical box is to be mounted. Tool 13 must be placed so that the selected step on the top plate 2 and the corresponding step on the base plate 10 are both placed against the wall stud on the side that is to carry the finished wall covering with the bottom surface of base plate 10 situated on the top surface of the bottom wall plate.

Once this is done, the electrical box is placed against the wall stud with the bottom surface of said electrical box positioned upon the top surface of top plate 2. This must be done in such a manner so that the opening of the electrical box is flush with the straight edge of top plate 2 opposite the side containing the plurality of steps. Once positioned, the electrical box is secured to the wall stud by the desired means, thus ensuring a standard placement for all electrical boxes to be installed.

A 30 inch extension rod 12 is included which can be attached to base plate 10 by threaded rod 11 and with the addition of another base plate 10 attached to the other end of extension rod 12, the operator can increase tool length to enable the installation of electrical switch boxes.

I claim:

1. An adjustable electrical box locator tool, comprising:
   (a) a base plate having at least two opposing edge surfaces, one such surface being essentially flat, the opposite surface being stepped with a plurality of steps, said steps increasing in height inwardly from an outside adjacent edge to the centerline of the base plate, said steps being mirrored through the center line of the base plate;
   (b) a top plate having at least two opposing edge surfaces, one such surface being essentially flat, the opposite surface being stepped with a plurality of steps, said steps increasing in height inwardly from an outside adjacent edge to the centerline of the top plate, said steps being mirrored through the center line of the top plate, said top plate further including a plurality of slots machined into the junction of each successive step with its preceding step, said slots machined perpendicular and in the direction of but not reaching the opposing essentially flat edge surface;
   (c) a hollow sheath rigidly mounted in perpendicular relation to the top plate by bolt means, said sheath further including a key disposed upon the inside surface of the sheath in parallel relation to the length of the sheath;
   (d) a hollow stem rigidly mounted in perpendicular relation to the base plate by bolt means, said stem being internally threaded a short distance into the stem beginning at the end opposite the end attached to the base plate; said stem having a channel longitudinally disposed along the outside length of the stem capable of slidably receiving a key disposed within the sheath, said channel situated so that when the stem and sheath are slidably engaged the essentially flat opposing edge surfaces of the base plate and top plate are in a planar alignment;
   (e) an adjustment bolt internally disposed within the sheath capable of engaging the threads machined into the stem, said adjustment bolt permitting rotational movement while simultaneously eliminating longitudinal movement by placement of a washer means between the head of the adjustment bolt and the sheath and a snap ring placed on top of the adjustment bolt head, the resulting combination minimizing the longitudinal movement of the adjustment bolt, rotation of the adjustment bolt in one direction results in the stem being drawn into the sheath thereby decreasing the distance between the top plate and base plate, whereas turning the adjustment bolt in the opposite direction causes a corresponding increase in the distance between the top plate and base plate.

2. An adjustable electrical box locator tool as claimed in claim 1, in which said hollow stem is permanently marked with units of measure, said units of measure visibly disposed along the length of said hollow stem.

3. An adjustable electrical box locator tool as claimed in claim 1, further including a thirty inch extension segment, said extension segment attaches to the base plate at one end by means of a threaded rod, attached to the opposite end of said extension segment by bolt means is an additional base plate, said additional base plate is positioned in a manner that continues and extends the planar alignment between the essentially flat opposing edge surfaces of the top plate and the original base plate.

* * * * *